United States Patent [19]

Shirasu

[11] 4,276,447
[45] Jun. 30, 1981

[54] SIGNAL PROCESSING APPARATUS FOR SUBSCRIBER CIRCUITS

[75] Inventor: Hirotoshi Shirasu, Yokohama, Japan

[73] Assignee: Hitachi, Ltd., Tokyo, Japan

[21] Appl. No.: 63,470

[22] Filed: Aug. 3, 1979

[30] Foreign Application Priority Data

Aug. 11, 1978 [JP] Japan .................. 53-109471[U]
Mar. 2, 1979 [JP] Japan .................. 54-24138

[51] Int. Cl.³ .................................................. H04Q 3/28
[52] U.S. Cl. ........................................................ 179/18 FG
[58] Field of Search ............... 179/18 J, 18 FG, 15 A, 179/15.55 T, 15 BY

[56] References Cited
U.S. PATENT DOCUMENTS 3,757,053  9/1973  Pell et al. ......................... 179/18 J
3,936,611  2/1976  Poole .............................. 179/18 FG Primary Examiner—Thomas A. Robinson
Attorney, Agent, or Firm—Craig & Antonelli

[57] ABSTRACT

A signal processing apparatus for subscriber circuits is disclosed which comprises a plurality of circuits each for extracting a signal corresponding to a.c. and d.c. signals flowing through each of a plurality of subscriber circuits, an analog multiplexing circuit connected to the output terminal of each of the plurality of extracting circuits, an analog-to-digital converter connected to the output terminal of the analog multiplexing circuit, and a signal processing circuit connected to the output terminal of the analog-to-digital converter and receiving successively and periodically a digital signal corresponding to the output signal of each of the extracting circuits for processing the digital signal to detect the state of each of the subscriber circuits, the reception of the digital signal being made by sending a selective signal to the analog multiplexing circuit.

7 Claims, 5 Drawing Figures

SIGNAL PROCESSING APPARATUS FOR SUBSCRIBER CIRCUITS

The present invention relates to a signal processing apparatus for subscriber circuits.

With the recent advance of full-electronic exchanges, subscriber circuits have been required to have various kinds of functions. Thus, they are provided with, for example, a direct current supervising function for detecting a calling signal, a clear-back signal, and a dial pulse, a call signal (or ringing) sending function, and a call signal stopping function at a time when a response (or an off-hook signal) to the call signal is detected.

In order to perform such functions, the conventional subscriber circuits include a detector responsive to the on-off action of a d.c. loop current, the on-off action being produced when a subscriber makes a call, clear-back, and a dialing, and a detector unresponsive to a call signal or ringing but responsive to a d.c. loop current due to the response of a called subscriber when the call signal is sent out.

However, since subscriber circuits in a telephone exchange are provided for every subscriber, the cost for one terminal of the telephone exchange is directly affected by that of the subscriber circuit. Therefore, in order to reduce the cost of the telephone exchange, it is necessary to employ a subscriber circuit having a small number of parts.

It is an object of the present invention to provide a signal processing apparatus for subscriber circuits which can perform the loop supervision for each subscriber circuit, the detection of ring trip signals, and the like with a common signal processing system.

It is another object of the present invention to provide a signal processing apparatus for subscriber circuits in which the signal processing in each of a plurality of subscriber circuits can be conducted in common.

It is a further object of the present invention to provide an economical signal processing apparatus for subscriber circuits.

In order to attain the above and other objects, according to the present invention, there is provided a signal processing apparatus for subscriber circuits which comprises a plurality of circuits each for extracting a signal corresponding to a.c. and d.c. signals flowing through each of a plurality of subscriber circuits, an analog multiplexing circuit connected to the output terminal of each of the plurality of extracting circuits, an analog-to-digital converter connected to the output terminal of the analog multiplexing circuit, and a signal processing circuit connected to the output terminal of the analog-to-digital converter and receiving successively and periodically a digital signal corresponding to the output signal of each of the extracting circuits for processing the digital signal to detect the state of each of the subscriber circuits, the reception of the digital signal being made by sending a selective signal to the analog multiplexing circuit.

The present invention will be described in detail by reference to the accompanying drawings in which.

Prior to the detailed explanation of the present invention, explanation will be made of the subscriber circuit, which has been previously filed in the U.S.A., application Ser. No. 005,469, filed Jan. 22, 1979, the amended title of which is "A Transformer Circuit with a Magnetic Field Cancellation Circuit", and in Canada on Jan. 16, 1979 by the present applicant, by reference to FIG. 1.

Figure 1:
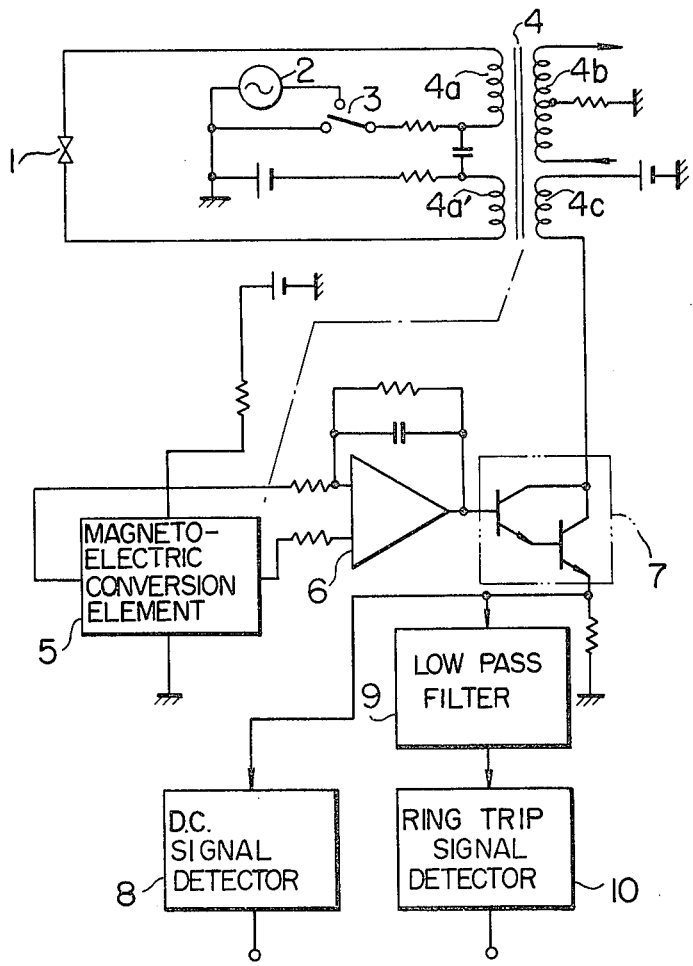
FIG. 1 is a schematic view showing a signal processing circuit in conventional subscriber circuits.

Referring to FIG. 1, reference numeral 1 denotes a subscriber's telephone, 2 an a.c. power supply having a frequency of 16 Hz and a voltage of 75 Vrms (or a call signal source), 3 a relay contact for changing over the sending and stopping of a call signal, and 4 a subscriber's transformer. The transformer 4 includes primary windings 4a and 4a', a secondary winding 4b and a winding 4c for compensating a d.c. magnetic field generated in the subscriber's transformer 4. Voice signals are transferred from the primary windings 4a and 4a' to the secondary winding 4b which is connected to a junction line. Further, reference numeral 5 denotes a magnetoelectric conversion element such as a Hall element connected magnetically to the subscriber's transformer 4, 6 a voltage amplifier including a capacitor which serves as a low pass filter for attenuating the voice signals, 7 a voltage-to-current converter, 8 a d.c. signal detecting circuit for supervising the loop of a subscriber circuit and for detecting a dial pulse, 9 a low pass filter for attenuating a call signal, and 10 a ring trip signal detecting circuit.

In the above-mentioned circuit construction, a magnetic flux generated in the subscriber's transformer 4 is detected by the magnetoelectric conversion element 5, and sent through the voltage amplifier 6 to the voltage-to-current converter 7 to be converted into an electric current. The converted current is fed back through the winding 4c to the subscriber's transformer 4 to compensate the d.c. magnetic field in the transformer 4. This negative feedback eliminates the magnetic saturation of the iron core in the subscriber's transformer 4, and improves the transmission characteristic of the subscriber circuit for voice signals. Further, a change in d.c. signal at the time when the subscriber's telephone 1 makes a call or clear-back, and sends dial pulses and a change in d.c. signal at a time when a response to a call signal has been made, are detected by the d.c. signal detecting circuit 8 and the ring trip signal detecting circuit 10, respectively, through the magnetoelectric conversion element 5, the voltage amplifier 6 and the voltage-to-current converter 7. The output signals from these detecting circuits 8 and 10 are supplied to a main processor (not shown) through a scanning device (not shown).

In general, such a subscriber circuit is installed in large numbers, and the d.c. signal detecting circuit and the ring trip signal detecting circuit are required at every subscriber circuit. Thus, the conventional circuit construction entails a high cost.

A preferred embodiment of the present invention will be explained below by reference to FIG. 2. The subscriber's telephone 1, a.c. power supply 2, relay contact 3, and subscriber's transformer 4, which are shown in FIG. 1, are omitted in FIG. 2 for the sake of simplicity.

Figure 2:
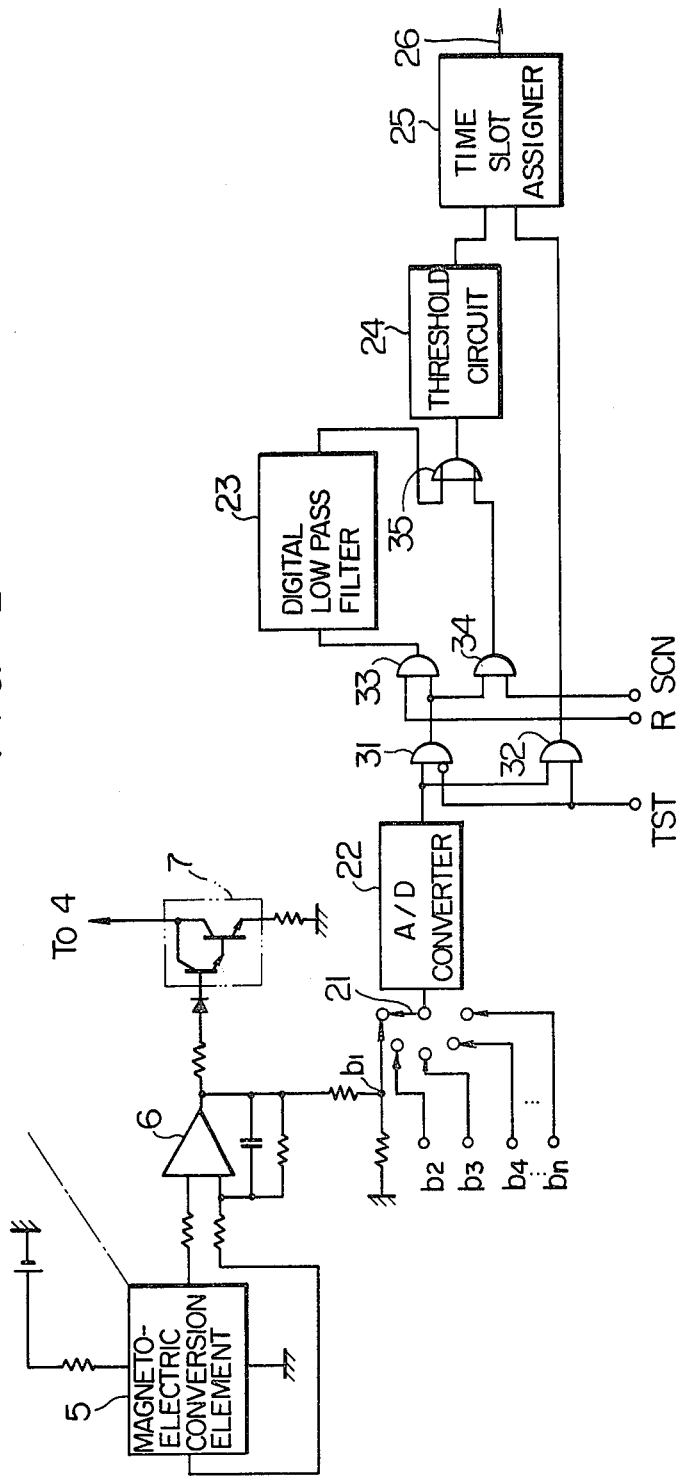
FIG. 2 is a schematic view showing an embodiment of a signal processing apparatus for subscriber circuits according to the present invention.

The magnetoelectric conversion element 5 in FIG. 2 is magnetically coupled with the subscriber's transformer 4 shown in FIG. 1. Further, in FIG. 2, reference numeral 21 denotes an analog multiplexer, 22 an analog-to-digital converter, 23 a digital low pass filter (DLPF), 24 a threshold detection circuit, 25 a time slot assigner, and 26 a highway. A magnetic flux generated in the subscriber's transformer 4 is detected and converted into a voltage by the magnetoelectric conversion element 5, and the voltage is supplied through the voltage amplifier 6 and a terminal $b_1$ to the analog multiplexer 21. The analog multiplexer 21 is connected to a plurality of similar subscriber circuits at terminals $b_2$ to $b_n$, and has such a function as multiplexing respective signals from these subscriber circuits in a time divisional fashion. A signal selected by the analog multiplexer 21 is converted by the analog-to-digital converter 22 into, for example, an 8-bit digital signal. The output signal of the analog-to-digital converter 22 is selected by an INHIBIT gate 31 and AND gate 33. At this time, terminals TST and R are applied with a signal of the level of "0" and a signal of the level of "1", respectively. The digital signals having passed through these gates 31 and 33 are applied to the threshold detection circuit 24 through the digital low pass filter 23 and an OR gate 35. When a signal detected by the magnetoelectric conversion element contains only an a.c. signal of 16 Hz, the signal is filtered by the digital low pass filter 23, and thus the output of each of the digital low pass filter 23 and the threshold detection circuit 24 becomes zero. When a telephone (which is indicated by reference numeral 1 in FIG. 1) in a subscriber circuit makes a response and thus a direct current flows through the subscriber circuit, the digital signal delivered from the analog-to-digital converter 23 contains a d.c. component. This d.c. component passes through the digital low pass filter 23 as it is, and is applied to the threshold detection circuit 24. When the d.c. component is greater than a threshold level which is set in the threshold detection circuit 24, the output signal of the circuit 24 assumes the level of 1. This output signal is sent to the time slot assigner 25 as an off-hook signal (or answer signal), to be outputted to the highway 26.

In the foregoing description, explanation has been made of a case where a signal of the level of "1" is applied to the terminal R and a signal of the level of "0" is applied to each of terminals TST and SCN. However, when the terminal TST has applied to it a signal of the level of "1" and each of the terminals R and SCN is applied with a signal of the level of "0", digital a.c. and d.c. signals having passed through an AND gate 32 are supplied as a kind of information to the time slot assigner 25 as they are to be sent out to the highway 26. In this case, data processing for the a.c. and d.c. signals is performed in an information processor (not shown) connected to the highway 26. Thus, for example, the continuity of line can be detected from the magnitude of current of the call signal having a frequency of 16 Hz, and a d.c. resistance of the circuit can be known from the magnitude of current of a d.c. signal. While, when the terminal SCN is applied with a signal of the level of "1" and each of the terminals R and TST is applied with a signal of the level of "0", the output of the analog-to-digital converter 22 is applied to the threshold detection circuit 24 without passing through the digital low pass filter 23. In this case, in the period when the circuit is employed, the detection of a direct current for the purpose of supervision is performed by the information processor (not shown) connected to the highway 26.

Figure 3:
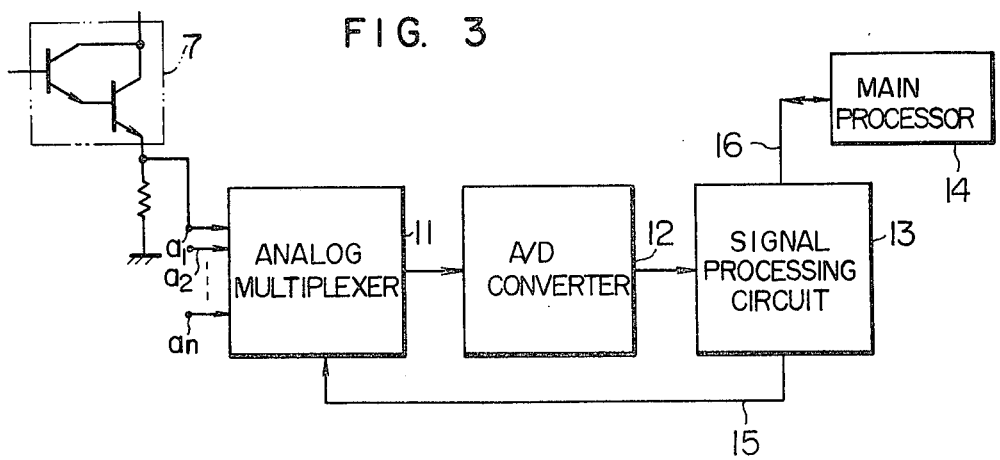
FIG. 3 is a schematic view showing another embodiment of a signal processing apparatus for subscriber circuits according to the present invention.

FIG. 3 is a circuit diagram showing another embodiment of the present invention. In FIG. 3, only a part of a subscriber circuit, namely, the voltage-to-current converter 7 is shown, and other parts are omitted, since they are the same as those shown in FIG. 1. Referring to FIG. 3, reference numeral 11 denotes an analog multiplexer connected to signal terminal $a_1, a_2, \ldots, a_n$ of a plurality of subscriber circuits, 12 an analog-to-digital converter, 13 a signal processing circuit, and 14 a conventional main processor for controlling an exchange. In FIG. 3, an analog signal is taken out of the terminal $a_1$ of the voltage-to-current converter 7 which is a part of the subscriber circuit shown in FIG. 1. The analog multiplexer 11 periodically changes over respective analog signals delivered from a plurality of subscriber circuits by selective signals which are supplied through a signal line 15 from the signal processing circuit 13 (which will be described later in detail), to successively send these analog signals to the analog-to-digital converter 12. The analog-to-digital converter 12 converts each analog signal into, for example, an 8-bit digital signal, and sends the digital signal to the signal processing circuit 13. The signal processing circuit 13 processes digital signals which are periodically applied, to discriminate states of each subscriber. The analog signal sent out of each subscriber circuit includes a change in d.c. signal at the time when a subscriber's telephone makes a call, clear-back, or sends dial pulses, and a change in d.c. signal which appears when the subscriber's telephone responds (or answers) to a call signal and is superposed on the call signal. As described later, the signal processing circuit 13 detects these changes, and performs such operations as the discrimination between calling and clear-back, the counting of dial pulses, and the discrimination between the presence and absence of a response to a call signal. These operations will be explained below in more detail by reference to FIG. 4 which shows a preferred circuit arrangement of the signal processing circuit 13.

Figure 4:
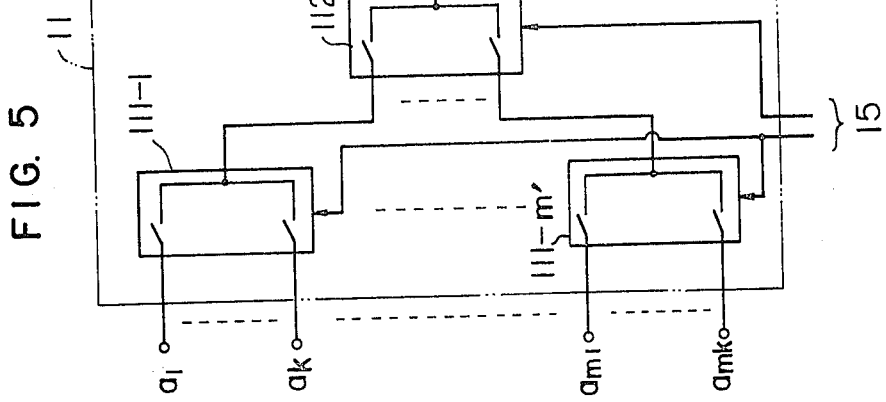
FIG. 4 is a block diagram for showing a main part of the signal processing apparatus shown in FIG. 3.

Referring to FIG. 4, a terminal 120 is applied with the output of the analog-to-digital converter 12, and terminals 121 and 122 are connected to the analog multiplexer 11 and the main processor 14, respectively. Reference numerals 131 and 132 denote a threshold comparison circuit and a discrimination circuit for discriminating between calling and clear-back, respectively, and these circuits make up a loop supervising circuit 123. Reference numerals 133 and 134 denote a threshold comparison circuit and a dial pulse discrimination circuit, respectively, and these circuits make up a dial pulse counting circuit 124. Reference numerals 135 and 136 respectively indicate a digital filter and a threshold comparison circuit, which make up a response supervising circuit 125. Reference numeral 137 denotes a selective signal generator for generating selective signals which drive the analog multiplexer, and reference numerals 138 and 139 denote a control circuit and a memory, respectively. Now, explanation will be made of the detection of calling and clear-back of a subscriber. When a subscriber makes a call, the subscriber's telephone is changed from the on-hook state to the off-hook state, and a d.c. signal begins to flow through the subscriber's line. Such a change in d.c. signal is detected by the magnetoelectric conversion element 5, and appears on the output terminal of the voltage-to-current converter 7 through the voltage amplifier 6, to be applied to the terminal a₁, FIG. 3. In a case that 256 subscriber circuits are included, for example, the signal resulting from the above-mentioned change in state is detected by the loop supervising circuit 123 which is operated at intervals of 128 milliseconds. In other words, the selective signal generator 137 supplies a selective signal having a period 128 mS to the analog multiplexer 11 shown in FIG. 3 on the basis of a control signal from the control circuit 138, and the analog-to-digital converter 12 is applied with a call or clear-back signal, which appears on, for example, the terminal FIG. 3, at interval of 128 mS. The analog multiplexer 11 successively scans signals which appear on the terminals $a_1, a_2, \ldots, a_n$, to conduct an analog multiplex transmission. The applied signal is converted by the analog-to-digital converter 12 into an 8-bit digital signal, and then inputted to the threshold comparison circuit 131. The inputted digital signal is compared with a digital threshold level to judge the presence or absence of a d.c. signal in the subscriber circuit. When the result of comparison is equal to the level of "0", it is shown that the subscriber assumes the on-hook state. While, the result equal to the level of "1" corresponds to the off-hook state of the subscriber. The output in the level of "1" or "0" from the threshold comparison circuit 131 is inputted to the discrimination circuit 132 for discriminating between calling and clear-back. The discrimination circuit 132 judges whether the subscriber has made a call or clearback, on the basis of the above-mentioned input and an input which was applied to the circuit 132 at the preceding scanning time, namely, at the scanning time 128 mS before, and has been stored in the memory 139. That is, when the present input assumes the level of "1" and the input read out of the memory 139 assumes the level of "0", it is judged that the subscriber has made a call, and the subscriber's number is stored in the memory 139. The detection of the clear-back signal can be performed in a similar manner. That is, when the output of the threshold comparison circuit 131 assumes the level of "0" and the input of the discrimination circuit 132, which is read out of the memory 139, assumes the level of "1", it is detected that the subscriber has rung off. However, the mere comparison between the present state and the state at the scanning time 128 mS before, may give rise to a malfunction due to chattering or the like, which malfunction lowers directly the reliability of speech. Therefore, in actual exchanges, both a signal at the preceding scanning and a signal which was applied to the discrimination circuit 132 two scannings before, are read out of the memory 139. When the former and latter signals assume the level of "0" and the level of "1", respectively, it is judged that the subscriber has rung off, and the subscriber's number is stored in the memory 139.

In such a manner, an analog signal from each of those ones of 256 subscriber lines which have not been called by other offices or subscribers, is selected successively and at intervals of 128 mS by the analog multiplexer 11, to be processed by the loop supervising circuit 123. All of new calling subscribers and subscribers who have newly rung off, are memorized in the memory 139. The information with respect to subscriber lines which are just called, for example, the subscriber's number has been stored in the memory 139 through the main processor 14. (Since this technique has been well known, the explanation thereof is omitted.) Therefore, a signal can be sent from the memory 139 to the selective signal generator 137 under the control of the control circuit 138, which signal prevents the selective signals having a period of 128 mS and corresponding to the called subscriber lines from being delivered from the selective signal generator 137. Thus, signals from subscribers who are just called, are never taken in by the analog-to-digital converter 12.

Next, explanation will be made of a method of counting dial pulses in the case when a new calling subscriber has been detected.

As explained above, the subscriber's number of the new calling subscriber is stored in the memory 139, and sent from the memory 139 to the main processor 14 to be used in various controls. In this case, a telephone number of a subscriber to whom the new calling subscriber makes a call, that is, dial numbers and number of digits thereof have to be detected. In the above-mentioned circuit construction, a control signal for dial pulse counting is sent from the main processor 14 to the control circuit 138. The control circuit 138 operates the dial pulse counting circuit 124 at intervals of, for example, 8 mS, and successively sends the information with respect to the subscriber's number of the new dialing subscriber from the memory 139 to the selective signal generator 137. In order for the analog multiplexer 11 to take in a dial signal from the subscriber line corresponding to the above-mentioned subscriber's number, the selective signal generator 137 sends a selective signal through signal lines 15 (shown in FIG. 5) to the analog multiplexer 11 at a period of, for example, 8 mS. The taken-in dial signal is converted by the analog-to-digital converter 12 (shown in FIG. 3) into a digital signal to be applied to the dial pulse counting circuit 124. In the dial pulse counting circuit 124, the applied digital signal is first compared with a digital threshold level in the threshold comparison circuit 133, in order to judge the presence or absence of a d.c. signal in the subscriber circuit. That is, the presence or absence of dial signal pulses is judged. A signal having the level of "1" or "0" which indicates the result of comparison in the comparison circuit 133, is applied to the dial pulse discrimination circuit 134. Though the dial pulse discrimination circuit 134 has been well known, brief explanation will be made below thereon. The counting of dial pulses is made on the basis of the result of comparison in the threshold comparison circuit 133 and the result of comparison at the preceding scanning which was effected 8 mS before. In more detail, when the present result of comparison is equal to "0" and the result of comparison at the preceding scanning is equal to "1", it is thought that a dial pulse is present, and a first counter of the dial pulse discrimination circuit 134 counts up the dial pulse. While, when the result of comparison is equal to "0", a digital value, for example, 13 is set in a second counter of the dial pulse discrimination circuit 134. This digital value is used to discriminate between dial numbers. When the result of comparison is equal to "1" and the contents of each of the first and second counters are not equal to "0", the contents of the second counter are counted down by one. At the time when the result of comparison is equal to "1", when the contents of the first counter are not equal to "0", and when the contents of the second counter become equal to "0", the digit of a dial number is advanced by one and the counted value of the dial pulse in the first counter is transferred temporarily to the memory register. These operations are successively conducted, and the dial numbers and the digits thereof are stored in the memory 139. These values, as is well known, are sent to the main processor 14 to control the exchange.

Next, explanation will be made of a method of detecting the response of a subscriber to whom the previously-mentioned calling subscriber sends a call signal. The subscriber's number of a subscriber who is to be called has been stored in the main processor 14 in a conventional manner, and is sent to the memory 139 to be stored therein. While, the response supervising circuit 125 is operated at intervals of 8 mS by a control signal from the control circuit 138 under the control of the main processor 14. Simultaneously, the subscriber's number of the subscriber who has just been called, is read out of the memory 139, and sent to the selective signal generator 137. In order for the analog-to-digital converter 12 to take in an analog signal from the subscriber circuit corresponding to the above-mentioned subscriber's number, the selective signal generator 137 sends selective signals having a period of 8 mS to the analog multiplexer 11. These selective signal are so generated as to differ in timing from the previously-mentioned selective signals for dial pulse counting. The analog signals from all subscribers who have just been called are successively sent through the analog multiplexer 11 to the analog-to-digital converter 12 in an analog multiplex fashion by these selective signals having a period of 8 mS. Each of these analog signals is converted by the analog-to-digital converter 12 into a 8-bit digital signal.

The response supervising circuit 125 includes, for example, the digital filter 135 for removing a call signal having a frequency of 16 Hz and the threshold comparison circuit 136. Since the structure of the digital filter 135 has been well known, detailed explanation thereof is omitted. When the input and output voltages of the digital filter 135 are given by f(t) and h(t), respectively, the relation between the input and output voltages can be expressed by the following equation:

$$h(n\tau) + Ah\{(n-1)\tau\} + Bf(n\tau) \quad (1),$$

where $A = CR/\tau/(CR/\tau + 1)$, $B = 1/(CR/\tau + 1)$, and C and R indicate a capacitance and a resistance of a primary CR filter, respectively.

The output h(t) of the digital filter 135 is applied to the threshold comparison circuit 136, and compared with a threshold level to detect the presence or absence of response from the called subscriber. In more detail, when the sampling period $\tau$ in the equation (1) is equal to 8 mS and the time constant defined by CR is equal to 120 mS, $A = 15/16$, and $B = 1/16$.

On the other hand, a digital value which corresponds to an electric current of about 10 mA flowing through a subscriber line or a voltage of about 0.5 V appearing on the terminal $a_1$, is set as the threshold level in the threshold comparison circuit 136. For example, a digital threshold level of 256 is set. When the analog-to-digital conversion in the analog-to-digital converter 12 is conducted in such a manner that an analog signal of 0.5 V is converted into a digital signal having a digital signal value of 16, the processing with respect to the coefficient B in the digital filter 135 becomes needless, and the comparison of the result of operation in the digital filter 135 with the digital threshold level is conducted by detecting an overflow of an 8-bit counter resulting from the application of the output of the digital filter 135.

Thus, the discrimination between on-hook and off-hook stages can be made, and it can be detected whether the called subscriber has made a response to a call signal or not. When the off-hook state is detected, that is, when it is detected that the called subscriber has made a response, the subscriber's number of the called subscriber is stored in the memory 139.

As mentioned above, the memory 139 stores therein the subscriber's number of a subscriber who is calling the subscriber's number of a subscriber who has clear-back, the subscriber's number of a subscriber who had sent dial pulses, the dial numbers and the number of digits thereof which were sent by a dialing subscriber, the subscriber's number of a called subscriber who has made a response, and the like, each of which is appropriately sent through the signal line 16 to the main processor 15 by a control signal from the control circuit 138, to control various operations in the exchange. Since the control process in the exchange is entirely the same as in conventional systems, explanation thereof is omitted.

In the foregoing explanation, the signal processing circuit shown in FIG. 4 detects a fact that a subscriber has made a call, clear-back, a dialing action, or the like. Needless to say, such detection may be made by a microcomputer.

Figure 5:
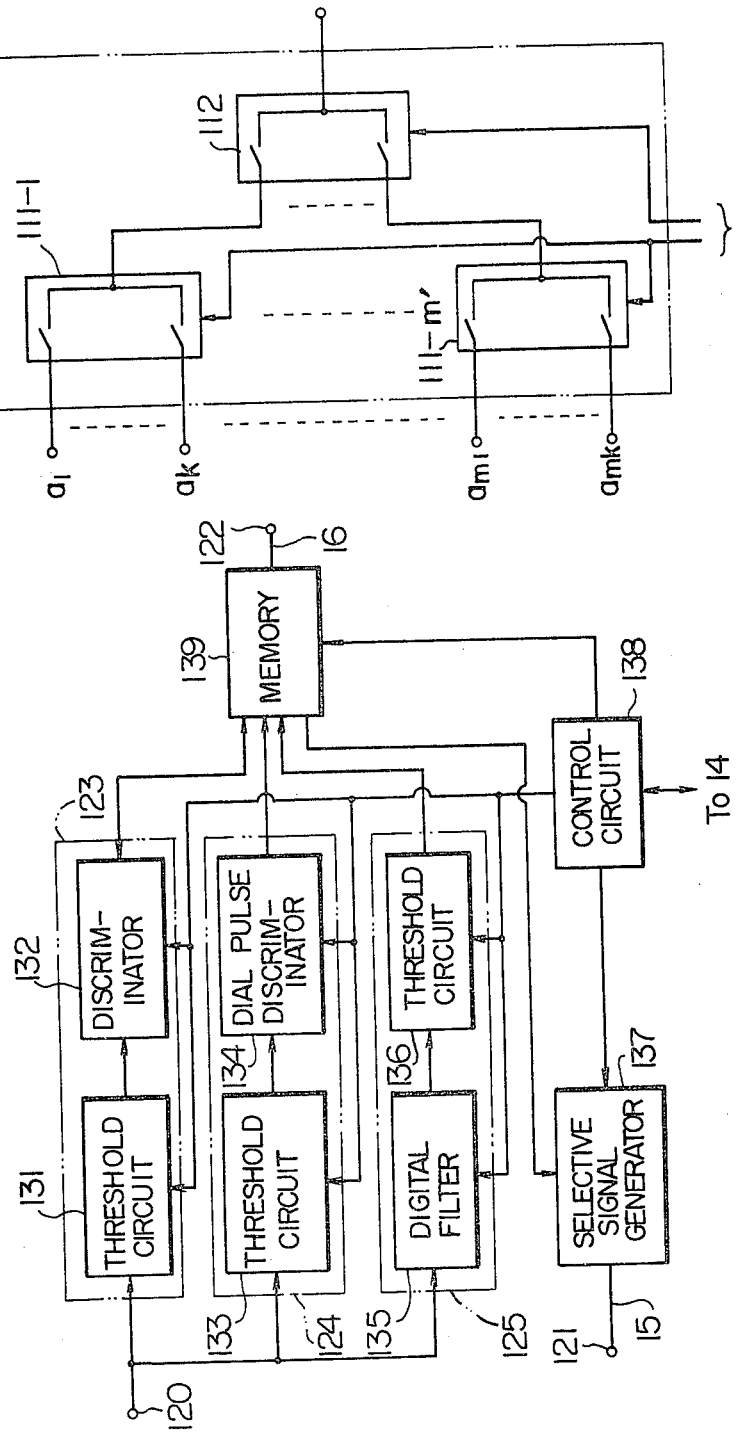
FIG. 5 shows an embodiment of a circuit arrangement of the analog multiplexer shown in FIG. 3.

FIG. 5 shows an example of the circuit arrangement of the analog multiplexer 11 shown in FIG. 3. In FIG. 5, reference numerals 111-1 through 111-m and 12 denote (m+1) analog multiplexers each having k input terminals. For example, analog signals from 256 subscriber circuits are applied to 16 (m=16) analog multiplexers 111-1 through 111-16, each of which has 16 (k=16) input terminals. The output of each of the analog multiplexers 111-1 through 111-16 is applied to the analog multiplexer 112. When an 8-bit signal is used as the selective signal which is applied through signal lines 15 to the analog multiplexer 11, the upper 4-bit portion of the signal is used to control the analog multiplexer 112, and the lower 4-bit portion controls the analog multiplexer 111-1 through 111-16. The loop supervision at an interval of 128 mS in the circuit arrangement shown in FIG. 4 can be conducted in the following manner. That is, 256 subscriber lines are divided into 16 groups, and each of the groups is selected one by one at intervals of 8 mS by the analog multiplexers 111-1 through 111-16 and 112.

What we claim is:

1. A signal processing apparatus for subscriber circuits comprising:
   an analog signal extracting circuit provided in each of said subscriber circuits for outputting analog signals changing in accordance with a D.C. signal and a ringing signal flowing into said each subscriber circuit;
   an analog multiplexing circuit connected to the output terminal of each of said plurality of extracting circuits;
   an analog-to-digital converter connected to the output terminal of said analog multiplexing circuit; and
   a signal processing circuit connected to the output terminal of said analog-to-digital converter and receiving successively and periodically a digital signal corresponding to the output signal of each of said extracting circuits for processing said digital signal to detect the state of each of said subscriber circuits, said reception of said digital signal being made by sending a selective signal to said analog multiplexing circuit to extract said signal flowing through the circuit of a subscriber who has just been called, receiving periodically a digital signal corresponding to said extracted signal, filtering said digital signal by a low pass filter, and comparing said filtered digital signal with a threshold level to detect whether said subscriber has made a response or not.

2. A signal processing apparatus for subscriber circuits comprising:

an analog signal extracting circuit provided in each of said subscriber circuits for outputting analog signals changing in accordance with a D.C. signal and a ringing signal flowing into said each subscriber circuit;

an analog multiplexing circuit connected to the output terminal of each of said plurality of extracting circuits;

an analog-to-digital converter connected to the output terminal of said analog multiplexing circuit; and a signal processing circuit connected to the output terminal of said analog-to-digital converter and receiving successively and periodically a digital signal corresponding to the output signal of each of said extracting circuits for processing said digital signal to detect the state of each of said subscriber circuits, said reception of said digital signal being made by sending a selective signal to said analog multiplexing circuit to select said signal flowing through the circuit of a subscriber who is dialing, receiving periodically a digital signal corresponding to said selected signal, comparing said digital signal with a threshold level, and counting dial pulses on the basis of the result of said comparison.

3. A signal processing apparatus for subscriber circuits comprising:

an analog signal extracting circuit provided in each of said subscriber circuits for outputting analog signals changing in accordance with a D.C. signal and a ringing signal flowing into said each subscriber circuit;

an analog multiplexing circuit connected to the output terminal of each of said plurality of extracting circuits;

an analog-to-digital converter connected to the output terminal of said analog multiplexing circuit; and a signal processing circuit connected to the output terminal of said analog-to-digital converter and receiving successively and periodically a digital signal corresponding to the output signal of each of said extracting circuits for processing said digital signal to detect the state of each of said subscriber circuits, said reception of said digital signal being made by sending a selective signal to said analog multiplexing circuit, wherein said signal processing circuit includes a threshold comparison circuit for detecting the presence or absence of a d.c. component in said signal flowing through a subscriber circuit and a circuit connected with said threshold comparison circuit for discriminating whether said subscriber has made a call or clear-back.

4. A signal processing apparatus for subscriber circuits comprising:

an analog signal extracting circuit provided in each of said subscriber circuits for outputting analog signals changing in accordance with a D.C. signal and a ringing signal flowing into said each subscriber circuit;

an analog multiplexing circuit adapted to be connected to each output of the analog signal extracting circuits;

an analog-to-digital converter connected to the output of said analog multiplexing circuit; and a signal processing circuit connected to the output of said analog-to-digital converter, which includes selection control means providing a selection signal for fetching the analog output signal from a selected extracting circuit among the extracting circuits to said analog multiplexing circuit, threshold means connected to said analog-to-digital converter for comparing digital output from said analog-to-digital converter with a digital threshold value and outputting a signal representing a state of direct current flowing into the subscriber circuit, and discriminating means for discriminating change of the state of the concerned subscriber circuit in accordance with the output of said threshold means.

5. A signal processing apparatus according to claim 4, wherein said signal processing circuit comprises a memory for storing information concerning the state of each of said subscriber circuits, said memory being accessible by a data processor controlling an exchange connected to said subscriber circuits, and said discriminating means renewing said information in said memory in accordance with the relationship between the output from said threshold means and previously-stored information concerning a previous state of the concerned subscriber circuit located in said memory.

6. A signal processing apparatus according to claim 4, wherein said discriminating means includes dial-pulse counting means connected to said analog-to-digital converter, and said dial-pulse counting means discriminates and counts the dial pulses by the output of said analog-to-digital converter and previously-stored information concerning a previous state of the concerned subscriber circuit in a memory included in said signal processing circuit, and writes a dial number in said memory.

7. A signal processing apparatus according to claim 4, 5 or 6, wherein said signal processing circuit comprises a digital filter connected to said analog-to-digital converter for eliminating said ringing signal from the digital output signal of said converter and second threshold means for comparing the output of said digital filter with a predetermined threshold, and said discriminating means discriminates change of the state of the concerned subscriber circuit by fetching the output of said second threshold means when said selection control means selects the analog signal from the subscriber circuit in a ringing state.

* * * * *